Patented Apr. 23, 1946

2,398,999

UNITED STATES PATENT OFFICE 2,398,999

POLYMETHINE DYES

Leslie G. S. Brooker and Homer W. J. Cressman, Rochester, N. Y., assignors to Eastman Kodak Company, Rochester, N. Y., a corporation of New Jersey No Drawing. Application September 1, 1942, Serial No. 456,927

11 Claims. (Cl. 260—240)

This invention relates to polymethine dyes and to a process for the preparation thereof. This application is a continuation-in-part of our co-pending application Serial No. 353,502, filed August 21, 1940, now Patent No. 2,317,357.

A number of cyanine dyes, merocyanine dyes, hemicyanine dyes and styryl dyes are known. These dyes contain a chromophore comprising a polymethine chain, one end of which is attached to the nitrogen atom of a heterocyclic nucleus, and the other end of which is attached, in the case of cyanine dyes, to the nitrogen atom of another heterocyclic nucleus; in the case of merocyanine dyes, to a carbonylic oxygen or sulfur atom; in the case of hemicyanine dyes, to the nitrogen atom of an alkylamino or arylamino group; and in the case of styryl dyes, to the nitrogen atom of a dialkylamino group, the hemicyanine and styryl dyes differing in that a part of the polymethine chain in the styryl dyes consists of the carbon atoms of an aromatic nucleus to which is attached the dialkylamino group, whereas in hemicyanine dyes the polymethine chain does not pass through an aromatic nucleus.

We have no found that cyanine, hemicyanine, merocyanine and styryl dyes can be made, containing a polymethine chain one end of which is attached to the nitrogen atom of a 3,4-trimethylenebenzothiazole nucleus. This nucleus differs from the nitrogenous heterocyclic nuclei in known dyes of these types, in that there is a bridge of atoms between the nitrogen atom and another atom in the nucleus. Our new dyes sensitize photographic silver halide emulsions, we have found.

It is, accordingly, an object of our invention to provide new dyes. A further object is to provide a process for preparing such dyes. A further object is to provide photographic emulsions sensitized with our new dyes. Other objects will become apparent hereinafter.

In accordance with our invention, we provide cyanine dyes by condensing 2-methyl-3,4-benzothiazolium quaternary salts with various substances. To prepare monomethine cyanine dyes, we condense a 2 - methyl - 3,4 - benzothiazolium quaternary salt with a cyclammonium quaternary salt containing in the alpha or gamma position (i. e. one of the so-called reactive positions) a halogen atom, such as iodine, or an alkylmercapto or arylmercapto group. The condensations are advantageously effected in the presence of an acid-binding agent, such as triethylamine, N-methylpiperidine, pyridine or sodium carbonate. The condensations are advantageously effected in a medium, such as ethyl, isopropyl or n-propyl alcohol. Heat accelerates the condensations.

To prepare symmetrical trimethine cyanine (carbocyanine) dyes, we condense a 2-methyl-3,4-benzothiazolium quaternary salt with an ester of an orthocarboxylic acid, e. g. ethyl orthoformate or ethyl orthoacetate. The condensations are advantageously effected in the presence of an acid-binding agent, such as pyridine. Heat accelerates the condensations.

To prepare unsymmetrical trimethine cyanine (carbocyanine) dyes, we condense a 2-methyl-3,4-benzothiazolium quaternary salt with a cyclammonium quaternary salt containing, in a reactive position, a β-arylaminovinyl group, e. g. a β-anilinovinyl or a β-acetanilidovinyl group. The condensations are advantageously effected in the presence of a basic condensing agent, such as triethylamine or piperidine. The condensations are advantageously effected in a medium, such as ethyl, isopropyl or n-propyl alcohol. Heat accelerates the condensations.

Also, we have found that 2-methyl-3,4-benzothiazolium quaternary salts can be condensed with diaryl formamidines, such as diphenyl formamidine, in the presence of a condensing agent, such as acetic anhydride, to give 2-(β-acylarylamino)-3,4-trimethylene - benzothiazolium quaternary salts which in turn can be condensed, in the presence of an acid-binding agent, with cyclammonium quaternary salts containing, in a reactive position, a methyl group, e. g. 2-methylbenzoxazole alkiodides, 2-methyl-benzothiazole alkyl-p-toluenesulfonates, 2-methyl-β-naphthothiazole alkiodides, quinaldine alkiodides, lepidine alkiodides and 2-methyl-3,4-trimethylenebenzothiazolium iodide, to give carbocyanine dyes.

We have also found that 2-methyl-3,4-benzothiazolium quaternary salts can be condensed with β-arylaminoacrolein anil salts, such as β-anilinoacrolein anil hydrochloride, in the presence of a condensing agent such as acetic anhydride, to give 2-(4-acylarylamino-1,3-butadienyl)-3,4-trimethylenebenzothiazolium quaternary salts which in turn can be condensed, in the presence of an acid-binding agent, with cyclammonium salts containing in a reactive position, a methyl group, e. g. 2-methylbenzoxazole alkiodides, 2-methylbenzothiazole alkiodides, 2-methyl-β-naphthothiazole alkyl-p-toluenesulfonates, quinaldine alkiodides, lepidine alkiodides and 2-methyl-3,4-trimethylenebenzothiazolium iodide, to give pentamethine cyanine (dicarbocyanine) dyes.

Hemicyanine dyes can be prepared from the aforesaid 2-(β-acylarylamino)- and 2-(4-acylarylamino-1,3-butadienyl)-3,4-trimethylenebenzothiazolium quaternary salts by heating the quaternary salts with amines such as aniline, n-primary butylamine, diethylamine, piperidine, morpholine and furfurylamine. The condensation is advantageously carried out in a medium such as ethyl alcohol, n-propyl alcohol or isopropyl alcohol.

Merocarbocyanine and merodicarbocyanine dyes can be prepared by condensing the aforesaid 2-(β-acylarylamino)- and 2-(4-acylarylamino-1,3-butadienyl)-3,4-trimethylene benzothiazolium quaternary salts with organic compounds containing a keto methylene group, such as 3-alkyl rhodanines, 3-aryl rhodanines, 2-dialkyl amino-4(5)-thiazolones, 2-diphenylamino-4(5)-thiazolone, 3-alkyl-2-thio-2,4(3,5)-oxazolediones, 1,3-diphenyl-2-thiohydantoin, 1-phenyl-3-alkyl-5-thiopyrazolones, 3-alkyl-1-phenyl-2-thiohydantoins, 2-thiobarbituric acids, benzoyl acetonitrile and cyano acetanilide. The condensations are advantageously carried out in the presence of an acid-binding agent such as triethylamine or piperidine in a medium such as ethyl alcohol n-propyl alcohol or isopropyl alcohol.

Styryl dyes can be prepared by condensing 2-methyl-3,4-trimethylene benzothiazolium quaternary salts with dialkylamino benzaldehydes and dialkylamino cinnamic aldehydes. The condensations are advantageously carried out using a catalyst such as diethylamine or piperidine in a medium such as ethyl alcohol, n-propyl alcohol or isopropyl alcohol.

The following examples will serve to illustrate our new dyes and the manner of obtaining the same.

*Example 1.—1'-ethyl-3,4-trimethylene-thia-2'-cyanine iodide*

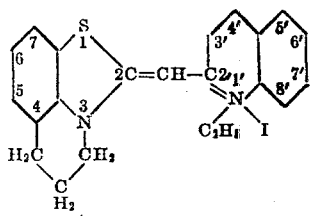

0.9 g. (1 mol.) of 2-methyl-3,4-trimethylene-benzothiazolium triiodide and 2.23 g. (3.6 mol.) of 2-phenylmercaptoquinoline ethiodide were placed in 15 cc. of pyridine. The mixture was boiled, under reflux, for 15 minutes. The resulting brownish solution was chilled to 0° C. The dye was filtered off, washed with water, acetone and then methyl alcohol, and then dried in the air. In this manner 0.5 g. (68% yield) of dye was obtained. After two recrystallizations from methyl alcohol (320 cc. per gram of dye) the dye was obtained, in 40 percent yield, as orange felted needles, melting at 286° to 287° C. with decomposition. A solution of the dye in methyl alcohol is yellowish brown. The dye sensitized a photographic gelatino-silver-bromiodide emulsion moderately strongly to 555 mu, with a maximum at about 510 mu.

In a similar manner, 2-methyl-3,4-trimethylenebenzothiazolium quaternary salts can be condensed with 2-methylmercaptobenzothiazole ethiodide, 2-phenylmercaptobenzothiazole ethiodide and 4-phenylmercaptopyridine ethiodide.

*Example 2.—3-ethyl-3',4'-trimethylene-oxathiacarbocyanine iodide*

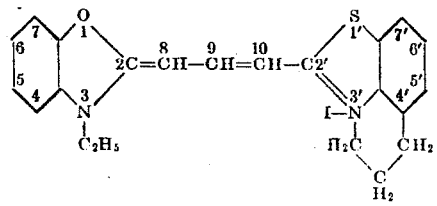

1.0 g. (1 mol.) of 2-methyl-3,4-trimethylenebenzothiazolium triiodide and 1.37 g. (1.8 mol.) of 2-(β-acetanilido-vinyl)-benzoxazole ethiodide were placed in 15 cc. of pyridine. The mixture was boiled, under reflux, for 15 minutes. The reaction mixture was cooled and the dye filtered off. The dye was washed well with methyl alcohol and dried in the air. 0.5 g. of crude dye (58 percent yield) was thus obtained. To reduce any dye-triiodide present to the monoiodide, the dye was dissolved in hot methyl alcohol and sulfur dioxide was slowly bubbled through the solution. The solution was cooled and the dye filtered off. The dye was thrice recrystallized from methyl alcohol and obtained, in 12 percent yield, as reddish needles having a blue reflex and melting at 258° to 259° C. with decomposition. Its methyl alcoholic solution was orange. It sensitized a photographic gelatino-silver-bromiodide emulsion strongly out to 605 mu with a maximum at 550 mu.

In a similar manner, 2-methyl-3,4-trimethylenebenzothiazolium iodide can be condensed with 2-(β-acetanilidovinyl) benzothiazole ethiodide, 2-(β-acetanilidovinyl)-thiazoline methiodide or 4-(β-anilinovinyl)-quinoline ethiodide.

*Example 3.—3,4; 3',4'-di(trimethylene) thiacarbocyanine iodide*

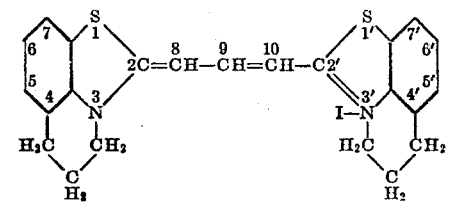

1.1 g. (2 mol.) of 2-methyl-3,4-trimethylenebenzothiazolium iodide and 0.98 g. (1 mol.+300 percent excess) of ethyl orthoformate were placed in 30 cc. of pyridine. The mixture was refluxed for 45 minutes. The dye separated from the hot reaction mixture. The mixture was cooled and the dye filtered off, washed well with methyl alcohol and dried in the air. In this manner, 0.75 g. (83 percent yield) of crude dye were obtained. It was recrystallized from methyl alcohol (710 cc. per gram of dye) and obtained, in 50 percent yield, as a felt of purplish crystals, melting at 308° to 309° C. with decomposition. Its methyl alcoholic solution was bluish red. It sensitized a photographic gelatino-silver-bromiodide emulsion strongly out to 680 mu, with a maximum at about 595 mu.

*Example 4.—2-(β-acetanilidovinyl)-3,4-trimethylenebenzothiazolium iodide*

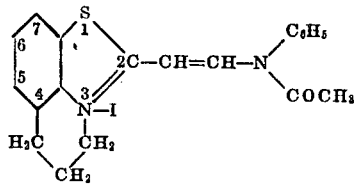

A mixture of 3.2 g. (1 mol.) of 2-methyl-3,4-trimethylene-benzothiazolium iodide and 2.4 g. (1.2 mol.) of diphenylformamidine in 10 cc. of acetic anhydride was refluxed gently over a free flame for 5 minutes. Upon cooling the mixture, the dark brown acetanilido compound crystallized out. It was filtered off, collected on a filter and washed with methyl alcohol and diethyl ether. Yield 3.4 g., 74 percent.

*Example 5.—2-(4-acetanilido-1,3-butadienyl)-3,4-trimethylenebenzothiazolium iodide*

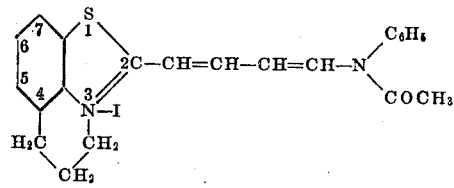

A mixture of 3.2 g. (1 mol.) of 2-methyl-3,4-trimethylenebenzothiazolium iodide and 2.5 g. (1 mol.) of β-anilinoacrolein anil hydrochloride in 50 cc. of acetic anhydride was refluxed for 45 minutes. The hot solution was filtered to remove a small portion of dark brown solid which was discarded. After cooling the filtered solution and diluting it with 350 cc. of diethyl ether, the acetanilido compound separated out. It was collected on a filter, washed with methanol and diethyl ether and dried. Yield: 3.8 g., 79 percent.

*Example 6.—2-(4-anilino-1,3'-butadienyl)-3,4-trimethylenebenzothiazolium iodide*

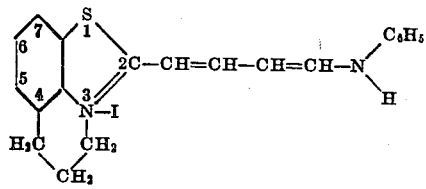

3.8 g. (1 mol.) of the acetanilido compound of the preceding example and 1.1 cc. (approximately 1.5 mol.) of aniline in 20 cc. of absolute ethyl alcohol were refluxed for 15 minutes. The solution, after a few minutes, rapidly assumed a reddish orange coloration. Upon cooling, the anilino compound separated out. It was filtered off and washed with methanol. Yield: 2 g., 57 percent. The dye, after two recrystallizations from methyl alcohol (125 cc. per gram of dye) was obtained as brownish crystals having a blue reflex, melting at 247° to 248° C. with decomposition. A solution of the dye in methyl alcohol was orange. The dye sensitized a photographic gelatino silver bromiodide emulsion to about 590 mu with maximum sensitivity at 540 mu.

*Example 7.—3-ethyl-5-[(3,4-trimethylene-2(3)-benzothiozolylidene)-ethylidene]-rhodanine*

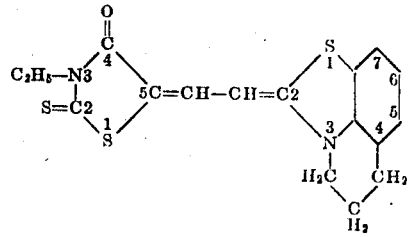

0.3 g. (1 mol.) of 5-acetanilidomethylene-3-ethylrhodanine, 0.32 g. (1 mol.) of 2-methyl-3,4-trimethylenebenzothiazolium iodide and 0.145 cc. (1.05 mol.) of triethylamine were placed in 15 cc. of absolute ethyl alcohol. The mixture was boiled, under reflux, for 20 minutes. The reaction mixture was cooled, the dye filtered off, washed with methyl alcohol and dried in the air. In this manner 0.25 g. (70 percent yield) of dye were obtained. The dye, after two recrystallizations from a mixture of pyridine and methyl alcohol was obtained in 42 percent yield, as reddish crystals melting at 288° to 289° C. with decomposition. A solution of the dye in methyl alcohol is pink. The dye sensitized a photographic gelatino-silver-bromiodide emulsion strongly out to 625 mu with a maximum at about 595 mu.

In a similar manner, 2-methyl-3,4-trimethylenebenzothiazolium iodide was condensed with 5-acetanilido-methylene-3-ethyl-2-thio-2,4(3,5)-oxazoledione to give 3-ethyl-5-[(3,4-trimethylene-2(3)-benzothiazolylidene)-ethylidene]-2-thio-2,4(3,5)-oxazoledione, in a yield of 74 percent. The dye, after two recrystallizations from a pyridine methyl alcohol mixture was obtained as reddish crystals, melting at 287° to 288° C. A solution of the dye in methyl alcohol was orange. The dye sensitized a photographic gelatino-silver-bromiodide emulsion strongly out to 630 mu, with a maximum at about 570 mu.

*Example 8.—3-methyl-1-phenyl-4-[(3,4-trimethylene-2(3)-benzothiazolylidene) ethylidene]-5-pyrazolone*

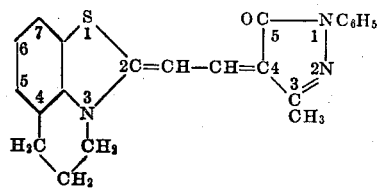

A mixture of 1.6 g. (1 mol.) of 2-β-acetanilidovinyl-3,4-trimethylenebenzothiazolium iodide, 0.6 g. (1 mol.) 3-methyl-1-phenyl-5-pyrazolone, and 0.46 cc. (1 mol.) triethylamine in 25 cc. absolute ethyl alcohol was refluxed 15 minutes. The reaction mixture was chilled and the dye collected on a filter and washed with methanol. Yield: 1.15 g., 92 percent. It was obtained as minute red crystals, melting at 238° to 239° C. without decomposition, after an extraction with 90 cc. hot methanol and recrystallization of the residue from methyl alcohol (400 cc./g.). A solution of the dye in methyl alcohol is orange. The dye sensitized a photographic gelatino-silver-bromoiodide emulsion to 570 mu with a slight maximum at 530 mu.

*Example 9.*—*5-[(3,4-trimethylene-2(3)-benzothiazolylidene) - ethylidene] -2- thiobarbituric acid*

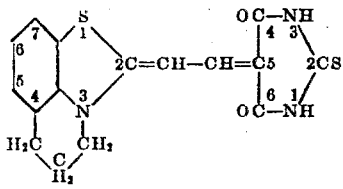

A mixture of 1.6 g. (1 mol.) 2-β-acetanilidovinyl-3,4-trimethylenebenzothiazolium iodide, 0.5 g. (1 mol.) thiobarbituric acid, and 0.46 cc. (1 mol.) triethylamine in 50 cc. absolute ethyl alcohol was refluxed for 15 minutes. The dye separated from the hot solution. After cooling it was collected on a filter and washed well with methanol. Yield: 1.15 g., 100 percent. The very insoluble dye was extracted with 100 cc. hot pyridine and filtered. The residue 1.0 g. was extracted a second time with 250 cc. hot pyridine from which on cooling 0.1 g. of dye separated. The first extract was discarded. The crystallized portion as well as the residue had a melting point greater than 325° C. and solutions of both portions in pyridine are orange. The dye is a weak sensitizer. It sensitized a photographic gelatino-silver-bromoiodide emulsion to 550 mu with no maximum sensitization.

*Example 10.*—*3-ethyl-1-phenyl-5-[(3,4-trimethylene-2(3)-benzothiazolylidene) ethylidene]-2-thiohydantoin*

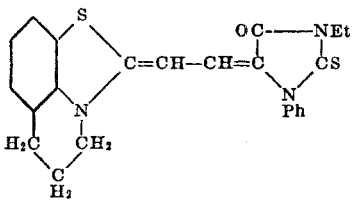

A mixture of 0.4 g. (1 mol.) 2-β-acetanilidovinyl-3,4-trimethylenebenzothiazolium iodide, 0.2 g. (1 mol.) 3-ethyl-1-phenyl-2-thiohydantoin, and 0.12 cc. (1 mol.) triethylamine in 15 cc. absolute ethyl alcohol was refluxed 20 minutes. The reaction mixture was chilled. The dye was collected on a filter, washed well with methanol. Yield: 0.3 g., 82 per cent. It was obtained as purplish crystals with blue reflex, melting at 246° to 247° C. without decomposition, after one extraction with 30 cc. hot methanol and recrystallization of the residue from a pyridine methyl alcohol mixture. A solution of the dye in acetone is orange. The dye, a strong sensitizer, sensitizing a photographic gelatino-silver-chlorobromide emulsion between 470 mu and 620 mu with a maximum at 580 mu.

*Example 11.*—*3-ethyl-1-phenyl-5-[(3,4-trimethylene - 2(3) - benzothiazolylidene) butenylidene]-2-thiohydantoin*

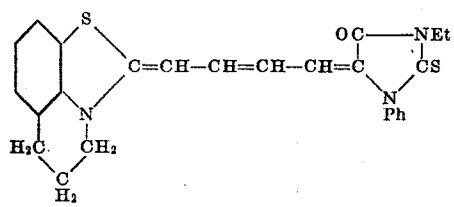

A mixture of 0.5 g. (1 mol.) 2-(4-anilino-1,3-butadienyl) - 3,4 - trimethylenebenzothiazolium iodide and 0.3 g. (1 mol.) 3-ethyl-1-phenyl-2-thiohydantoin in 25 cc. pyridine was refluxed gently over a free flame for 45 minutes. The pyridine solution assumed a bluish red coloration after 5 to 10 minutes heating. The solvent was removed under diminished pressure by heating on the water bath. The residue was suspended in 20 cc. cold ethyl alcohol, collected on a filter, washed with methanol. Yield: 0.2 g., 50 per cent. The dye was obtained as blue crystals, melting at 265° to 266° C. without decomposition, after an extraction with 20 cc. hot methanol and recrystallization of the residue from a pyridine methyl alcohol mixture. Solution of the dye in acetone is purple. The dye sensitized a photographic silver bromoiodide emulsion from 560 mu to 730 mu with a maximum at 675 mu.

*Example 12.*—*2-(p-dimethylaminostyryl)-3,4-trimethylenebenzothiazolium iodide*

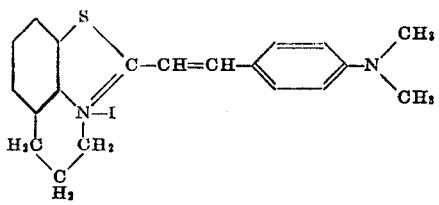

1.09 g. (1 mol.) of 2-methyl-3,4-trimethylenebenzothiazolium iodide and 0.47 g. (1 mol.) of p-dimethylaminobenzaldehyde were placed in 25 cc. of absolute ethyl alcohol. Three drops of piperidine were added to the mixture, and the resulting mixture was refluxed for 4½ hours. The dye separated from the bluish red solution. After cooling, the dye was collected on a filter, washed with methyl alcohol and dried in the air. 1.0 g. (71 percent) yield of dye, was obtained. After three recrystallizations from methyl alcohol (250 cc. per gram of dye), the dye was obtained, in 35 percent yield, as dull purplish crystals. A solution of the dye in methyl alcohol was bluish red. The dye sensitized a photographic gelatino-silver-bromoiodide emulsion weakly out to about 630 mu, with an ill-defined maximum at about 590 mu.

In a similar manner p-diethylamino-benzaldehyde and other dialkylamino-benzaldehydes and dialkylamino cinnamic aldehydes can be condensed with our new quaternary salts.

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proven satisfactory as a solvent for our new dyes. Ethyl alcohol or acetone may also be employed where the solubility of the dyes in methanol is lower than desired.

Sensitization by means of our new dyes is, of course, directed primarily to the ordinarily employed gelatino - silver - halide developing - out emusions. The dyes are advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory. A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino - silver - bromide (including bromiodide) emulsions. With fine-grain emulsions, which includes most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

The 2-methyl-3,4-trimethylenebenzothiazolium quaternary salts employed herein can be prepared by oxidizing 1-thioacetyl-1,2,3,4-tetrahydroquinoline with a halogen such as bromine or iodine, as described in our copending application, Serial No. 353,502, filed August 21, 1940, now Patent No. 2,317,357.

What we claim as our invention and desire to be secured by Letters Patent of the United States is:

1. The cyanine dyes represented by the following general formula:

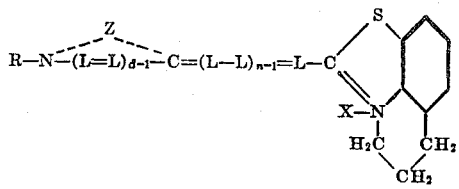

wherein L represents a methine group, $n$ represents a positive integer of from 1 to 3, $d$ represents a positive integer of from 1 to 2, R represents an alkyl group, X represents an anion, and Z represents the non-metallic atoms necessary to complete a heterocyclic nucleus containing from 5 to 6 atoms in the heterocyclic ring.

2. The carbocyanine dyes represented by the following general formula:

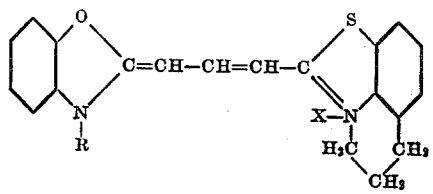

wherein R represents an alkyl group and X represents an anion.

3. The carbocyanine dyes represented by the following general formula:

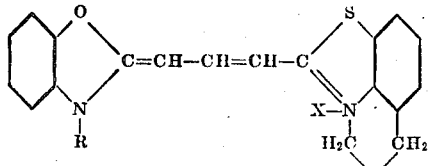

wherein R represents an alkyl group and X represents a halide anion.

4. The carbocyanine dyes represented by the following general formula:

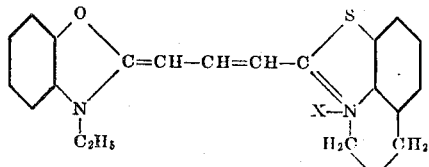

wherein X represents a halide anion.

5. The carbocyanine dye represented by the following formula:

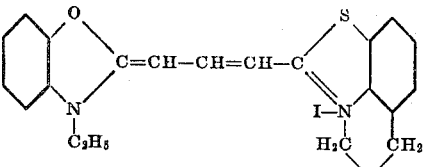

6. The carbocyanine dyes represented by the following general formula:

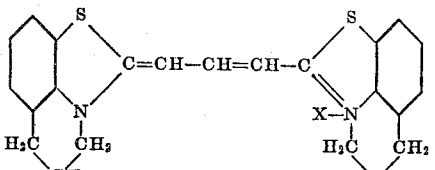

wherein X represents an anion.

7. The carbocyanine dyes represented by the following general formula:

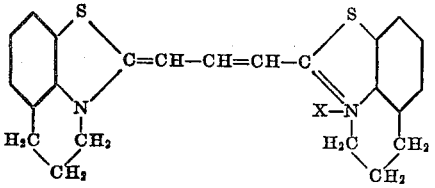

wherein X represents a halide anion.

8. The carbocyanine dye represented by the following formula:

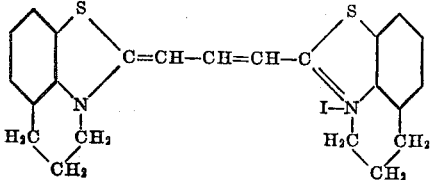

9. The monomethine cyanine dyes represented by the following general formula:

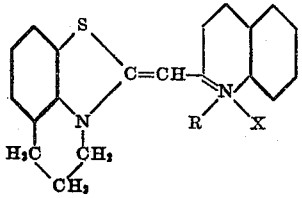

wherein R represents an alkyl group and X represents an anion.
10. The monomethine cyanine dyes represented by the following general formula:
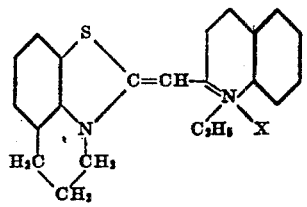
wherein X represents a halide anion.
11. The monomethine cyanine dye represented by the following formula:
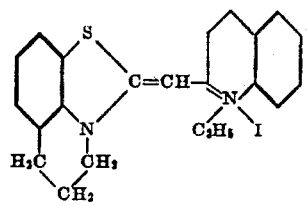
LESLIE G. S. BROOKER.
HOMER W. J. CRESSMAN.